United States Patent [19]

Weber

[11] Patent Number: 5,729,705
[45] Date of Patent: Mar. 17, 1998

[54] METHOD AND APPARATUS FOR ENHANCING THROUGHPUT OF DISK ARRAY DATA TRANSFERS IN A CONTROLLER

[75] Inventor: Bret S. Weber, Wichita, Kans.

[73] Assignee: Symbios Logic Inc., Fort Collins, Colo.

[21] Appl. No.: 506,148

[22] Filed: Jul. 24, 1995

[51] Int. Cl.⁶ ................................................. G06F 13/12
[52] U.S. Cl. ........................ 395/308; 395/309; 395/566; 395/847
[58] Field of Search .................................. 395/840, 847, 395/566, 306, 308, 309

[56] References Cited

U.S. PATENT DOCUMENTS

| | | | |
|---|---|---|---|
| 4,965,801 | 10/1990 | DuLac | 371/40.1 |
| 5,253,348 | 10/1993 | Scalise | 395/325 |
| 5,257,391 | 10/1993 | DuLac et al. | 395/800 |
| 5,287,476 | 2/1994 | Keener et al. | 395/425 |
| 5,289,418 | 2/1994 | Youngerth | 365/201 |
| 5,363,492 | 11/1994 | King et al. | 395/325 |
| 5,379,384 | 1/1995 | Solomon | 395/325 |
| 5,392,407 | 2/1995 | Heil et al. | 395/325 |
| 5,434,976 | 7/1995 | Tan et al. | 395/200 |
| 5,542,053 | 7/1996 | Bland et al. | 395/309 |

FOREIGN PATENT DOCUMENTS

| | | | |
|---|---|---|---|
| 0416331 | 3/1991 | European Pat. Off. | G05B 19/417 |
| 0487901 | 6/1992 | European Pat. Off. | G06F 3/06 |
| 0629956 | 12/1994 | European Pat. Off. | G06F 13/140 |

*Primary Examiner*—Glenn A. Auve
*Assistant Examiner*—Jeffrey K. Seto
*Attorney, Agent, or Firm*—Paul J. Maginot; Wayne P. Bailey

[57] ABSTRACT

A method for transferring data in a controller having a processor and a controller support device, with the controller connected to a host device and a disk drive. The method includes the steps of providing the controller with a first bus and a second bus, connecting a first bus between the disk drive and the host device, connecting a second bus between the processor and the controller support device, transferring first data between the disk drive and the host device across the first bus, and transferring second data between the processor and the controller support device across the second bus without consuming any portion of the bandwidth of the first bus. A controller architecture is also disclosed.

17 Claims, 3 Drawing Sheets

METHOD AND APPARATUS FOR ENHANCING THROUGHPUT OF DISK ARRAY DATA TRANSFERS IN A CONTROLLER

BACKGROUND OF THE INVENTION

The present invention relates to a method and apparatus for enhancing throughput of disk array data transfers in a controller.

A PCI (Peripheral Component Interconnect) Local Bus is a known high performance, 32-bit or 64-bit bus with multiplexed address and data lines. It is intended for use as an interconnect mechanism between highly integrated peripheral controller components, peripheral add-in boards, and processor/memory systems. FIG. 1 is a block diagram of a known PCI Local Bus system architecture implemented in a personal computer 4. The processor/cache/DRAM (Dynamic Random Access Memory) subsystem is connected to a PCI Local Bus through a bridge/memory controller which provides a low latency path through which the processor may directly access PCI-based devices mapped anywhere in the memory or I/O address spaces. The bridge/memory controller also provides a path which permits PCI Local Bus masters direct access to the DRAM. U.S. Pat. No. 5,379,384 discloses a bridge/memory controller for use in the known PCI Local Bus system architecture. An exemplary bridge/memory controller chip set is the 82420 PCIset Cache/Memory Subsystem comprising an 82423TX Data Path Unit (DPU) and an 82424ZX Cache and DRAM Controller (CDC), manufactured by Intel Corporation.

The known PCI Local Bus system architecture has also been adapted to a disk array controller 6 as shown in FIG. 2. In addition to the processor/cache/DRAM subsystem and the bridge/memory controller, the disk array controller 6 includes a second DRAM connected to the PCI Local Bus through a RAID (Redundant Array of Independent Disks) Parity Assist (RPA) circuit. The disk array controller 6 also includes a System Input/Output (SIO) circuit which interfaces a bus such as an ISA (Industry Standard Architecture) bus to the PCI Local Bus, and one or more input/output processors (IOPs) which connect one or more disk drives 8 to the PCI Local Bus through a channel, such as a SCSI (Small Computer System Interface) bus. The SIO circuit includes arbitration logic which handles the PCI Local Bus arbitration. The disk drive 8 includes one or more storage media (not shown) such as disks connected to each channel. A plurality of additional controller resources such as non-volatile RAM, flash EPROM, Serial I/O port etc. are connected to the ISA bus. The SIO circuit includes arbitration logic which handles the PCI Local Bus arbitration.

The first or main memory DRAM of the disk array controller 6 is typically implemented as a microprocessor code and data RAM for use in storing code and data for the processor. The second DRAM is typically implemented as a data transfer buffer for temporarily storing data to be read from or written to the one or more storage media across the PCI Local Bus. One disadvantage of the known PCI-based disk array controller architecture shown in FIG. 2 is the cost of providing two separate DRAM subsystems within the disk array controller. Thus, the known PCI-based dual memory controller architecture is not suitable for low cost disk array controller applications.

An additional disadvantage of the known PCI-based disk array controller architecture shown in FIG. 2 is that a portion of the bandwidth of the PCI Local Bus is consumed by non-disk array-related data transfers across the PCI Local Bus such as data transfers between the processor and the resources connected to the ISA bus. More specifically, the processor must first arbitrate for the PCI Local Bus, and once access to the PCI Local Bus is granted, data is transferred across the PCI Local Bus thereby reducing the capacity of the PCI Local Bus to transfer data to/from the disk array.

SUMMARY OF THE INVENTION

In accordance with one embodiment of the present invention, there is provided a method for transferring data in a controller having a processor, a first bus and a controller resource, with the controller being connected between a host device and a disk drive. The method includes the steps of transferring first data between the host device and the disk drive across the first bus, and transferring second data between the processor and the controller resource without consuming any portion of the bandwidth of the first bus.

Pursuant to another embodiment of the present invention, there is provided a method for transferring data in a controller having a processor and a controller support device, with the controller connected to a host device and a disk drive. The method includes the steps of providing the controller with a first bus and a second bus, connecting a first bus between the disk drive and the host device, connecting a second bus between the processor and the controller support device, transferring first data between the disk drive and the host device across the first bus, and transferring second data between the processor and the controller support device across the second bus without consuming any portion of the bandwidth of the first bus.

Pursuant to yet another embodiment of the present invention, there is provided a controller connected to a host device and a disk drive, with the controller including a first bus connected between the host device and the disk drive, a processor, a controller support device, and a second bus connected between the processor and the controller support device, wherein all data transfers between the processor and the controller support device occur without consuming any portion of the bandwidth of the first bus.

It is therefore an object of the present invention to provide a new and useful method for transferring data in a controller.

It is therefore an object of the present invention to provide an improved method for transferring data in a controller.

It is another object of the present invention to provide a new and useful controller.

It is another object of the present invention to provide an improved controller.

It is a further object of the present invention to provide a controller with enhanced throughput of disk array data transfers.

It is yet another object of this invention to provide a method for enhancing throughput of disk array data transfers in a controller.

The above and other objects, features, and advantages of the present invention will become apparent from the following description and the attached drawings.

DETAILED DESCRIPTION OF THE PREFERRED EMBODIMENT

Figure 1:
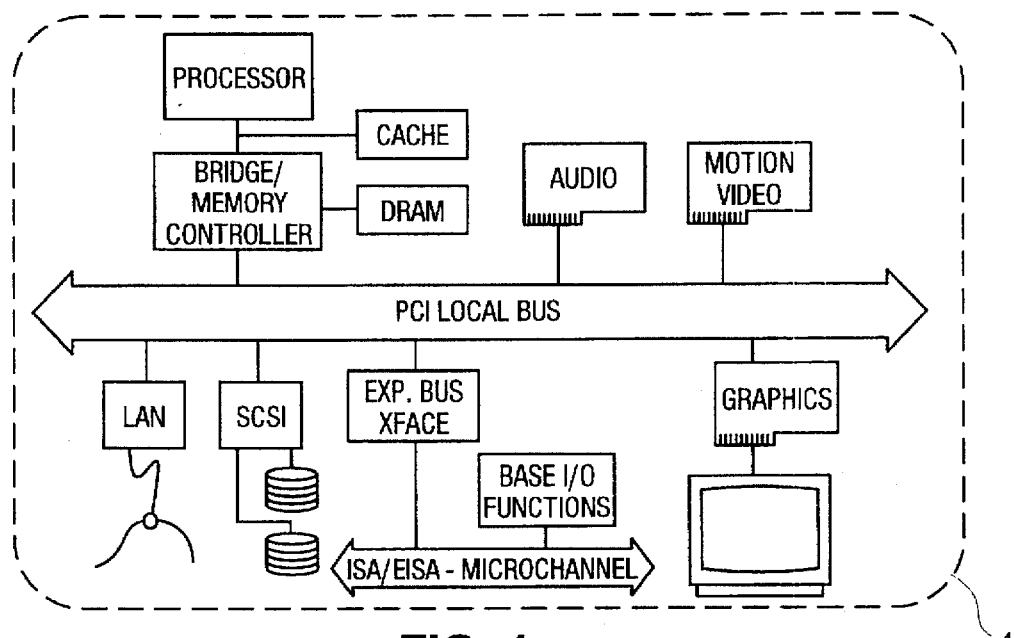
FIG. 1 is a block diagram of a prior art PCI Local Bus system architecture implemented in a personal computer environment.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 3:
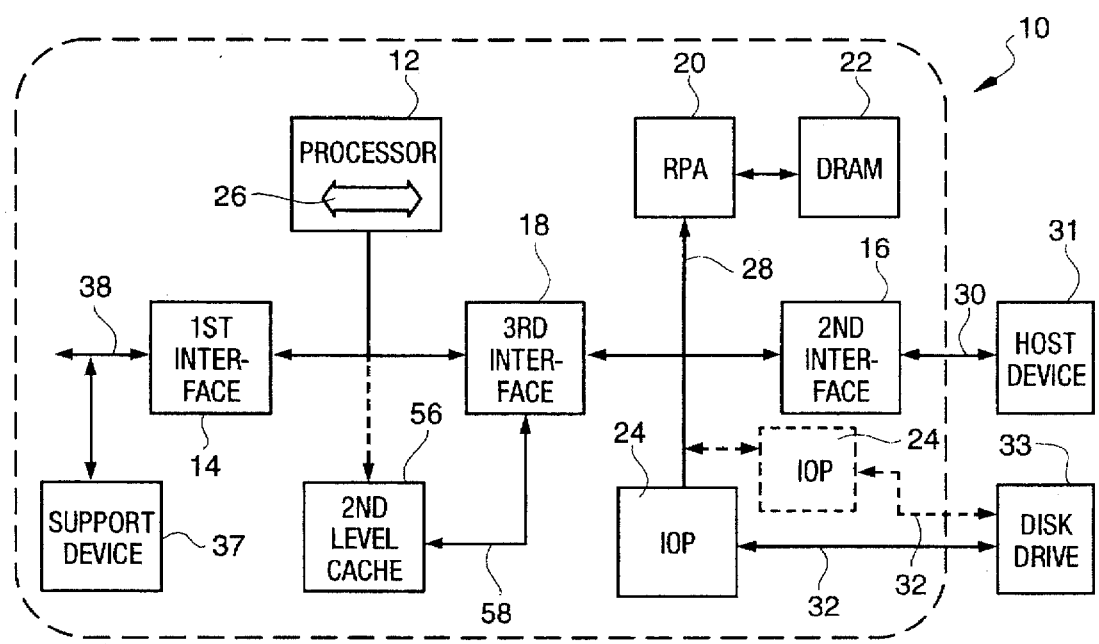
FIG. 3 is a block diagram of a first embodiment of a PCI-based disk array controller.

Referring now to FIG. 3, there is shown a block diagram of a PCI Local Bus-to-SCSI Bus disk array controller 10. The disk array controller 10 includes a main processor 12 such as a microprocessor, a first interface circuit 14, a second interface circuit 16, a third interface circuit 18, a RAID Parity Assist (RPA) circuit 20, a RAM device 22 such as a DRAM, and one or more input/output processors (IOPs) 24. In the embodiment being described, the main processor 12 is a microprocessor from the Intel 80486 family of microprocessors. An exemplary microprocessor is the 80486SX-33 that is available from Intel Corporation.

The processor 12 includes an internal local bus 26 and one or more external input/output pins or pads which provide external access to the internal local bus 26. The first interface circuit 14 and the third interface circuit 18 are connected to the internal local bus 26. The second interface circuit 16, third interface circuit 18, RPA circuit 20 and input/output processor 24 are connected to a PCI Local Bus 28. The second interface circuit 16 is also connected to a host PCI Local Bus 30 through a slot (not shown) such as a PCI Local Bus slot of a host device 31 such as a computer or a file server. The PCI Local Bus standard is defined in the document entitled PCI Local Bus Specification, Revision 2.1 which is available from the PCI Special Interest Group, P.O. Box 14070, Portland, Oreg. 97214, and which is incorporated herein by reference.

The input/output processor 24 is connected to one or more disk drives 33 through a channel 32, such as a SCSI bus. SCSI is a communications protocol standard for input/output devices. The first version of the standard, SCSI-1, is described in ANSI Document No. X3.131-1986 which is incorporated herein by reference. The SCSI-1 specification has been upgraded with an expanded interface referred to as SCSI-2. The SCSI-2 specification is described in ANSI Document No. X3.131-1994 which is also incorporated herein by reference.

It should be appreciated that additional disk drives 33 can be connected to the PCI Local Bus 28 through one or more additional input/output processors 24 and channels 32 as shown in phantom. An array of disk drives may incorporate a design termed "Redundant Array of Inexpensive Disks" (RAID). Five levels of RAID design, termed RAID-1 through RAID-5, are known in the art and are described in the publication entitled "A Case for Redundant Arrays of Inexpensive Disks (RAID)" by David A. Patterson, Garth Gibson and Randy H. Katz; University of California Report No. UCB/CSD 87/391, December 1987, which is incorporated herein by reference.

The input/output processor 24 executes ASIC-specific (Application Specific Integrated Circuit) instructions independent from controller firmware which is executed by the processor 12. An example of a suitable input/output processor is a SCSI Input/Output Processor (SIOP) 53C825A chip or 53C875 chip manufactured by Symbios Logic Inc. of Fort Collins, Colo. The 53C825A and 53C875 input/output processors execute SCRIPTS instructions which are an ASIC-specific instruction set specifically designed for controlling the 53C8XX family of Symbios Logic Inc. products.

The RPA circuit 20 includes memory controller circuitry and exclusive-OR (XOR) parity circuitry. During an exemplary read operation, the RPA circuit 20 functions as a PCI-based DRAM controller and the DRAM 22 functions as a cache buffer. More specifically, read data is initially sent from one or more disk drives 33 connected to the channel 32 through the input/output processor 24 and across the PCI Local Bus 28 to the DRAM 22. Once the read data is stored in the DRAM 22, the processor 12 schedules a second operation where the read data is sent from the DRAM 22 back across the PCI Local Bus 28 and through the second interface circuit 16 to the host device 31.

During an exemplary write operation, such as a RAID level 3 write operation, "new" write data is initially sent from the host device 31 through the second interface circuit 16 and across the PCI Local Bus 28 to a first location within the DRAM 22. The "old" data is then read from a data disk of the disk drive 33 across the PCI Local Bus 28 into a second location within the DRAM 22, and the "old" parity information is read from a parity disk of the disk drive 33 across the PCI Local Bus 28 into a third location within the DRAM 22. The RPA circuit 20 then independently and transparently performs conventional read-modify-write operations where "new" parity information is generated by exclusive-ORing the "old" data, "old" parity information and "new" data which are stored within the DRAM 22. After the "new" parity information is calculated and stored in a fourth location within the DRAM, the processor 12 schedules a write operation to write the "new" write data to a data disk of the disk drive 33 from the DRAM 22 and/or "new" parity information to a parity disk of the disk drive 33 from the DRAM 22. An example of a suitable RPA circuit 20 is the RAID Parity Assist chip provided by Symbios Logic Inc. as part of their existing controller products.

Figure 2:
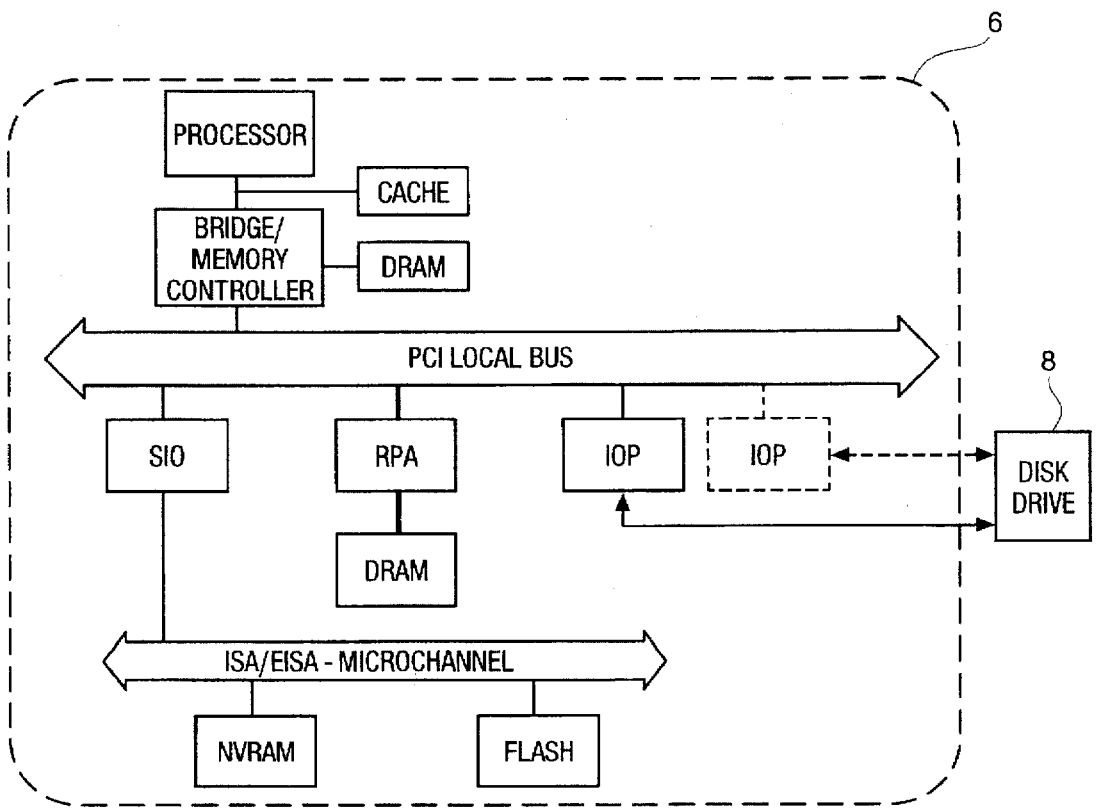
FIG. 2 is a block diagram of a prior art PCI Local Bus system architecture implemented in a disk array controller environment.

The first interface circuit 14 includes circuitry for interfacing the processor 12 to one or more controller resources or devices 37 such as a battery-backed RAM and a flash EPROM which are connected to an auxiliary bus 38 such as, or similar to an ISA bus. In operation, non-disk array-related data transfers to/from the processor 12 are sent across the processor local bus 26 through the first interface chip 14. It should be appreciated that this is an advantage over prior art designs such as shown in FIG. 2 in that the prior art architecture requires that non-disk array-related data transfers are sent across the PCI Local Bus thus consuming any portion of its available bandwidth. In contrast, the architecture of the present invention does not require non-disk array-related activity to be sent across the PCI Local Bus 28, thus increasing the bandwidth available for disk array-related data transfers across the PCI Local Bus 28.

Figure 5:
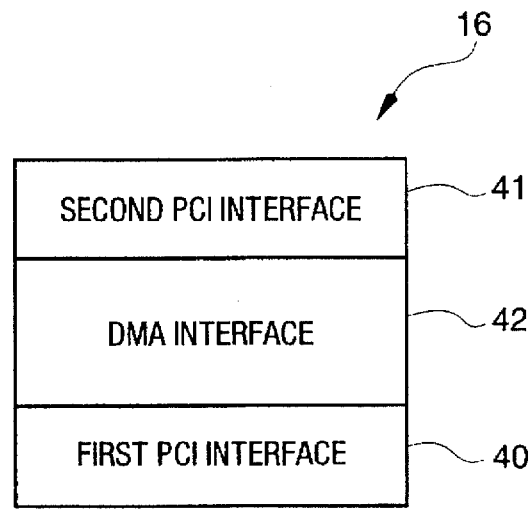
FIG. 5 is a block diagram of a second interface circuit of the disk array controllers shown in FIG. 3.

The second interface circuit 16 includes circuitry for interfacing the PCI Local Bus 28 to the host PCI Local Bus 30. As shown in FIG. 5, the second interface circuit 16 includes a first PCI interface circuit 40, a second PCI interface circuit 41 and a high-bandwidth DMA (Direct memory Access) interface circuit 42.

The first PCI interface 40 implements a conventional SCRIPTS engine which minimizes software impact by permitting existing software drivers to operate with the PCI-based controller 10. More specifically, when the host device 31 initiates a disk read/write operation, the host device 31 can use existing SCSI device drivers as well as performance enhanced disk array drivers to communicate with the PCI-based controller 10.

For example, when the host device 31 desires to write 64-Kbytes of data that is stored in separate blocks throughout the host memory to the disk drive 33, the host device 31 provides a conventional scatter-gather list to the SCRIPTS engine of the first PCI interface 40. The scatter-gather list indicates where the blocks of write data are located in a host memory map. The SCRIPTS engine implemented in the first PCI interface 40 uses the scatter-gather list to build linked DMA (Direct Memory Access) operations which fetch the blocks of write data from the host device. The second PCI interface 41 implements a separate conventional SCRIPTS engine which builds a separate scatter-gather list to indicate where the blocks of write data are to be stored in the disk drive 33. Thus, the total length of write data transferred e.g. 64-Kbytes, is the same on both sides of the second interface circuit 16. However, the SCRIPTS engines in the first and second PCI interfaces 40, 42 operate independently to transfer the blocks of write data from one scatter-gather list to a separate scatter-gather list across the DMA interface 44. In addition, the DMA interface decouples or buffers the operating speeds between the first and second PCI interfaces 40, 41. For example, the host device PCI Local Bus 30 could be operating at 25 MHz while the disk array PCI Local Bus 28 is operating at 33 MHz.

Figure 6:
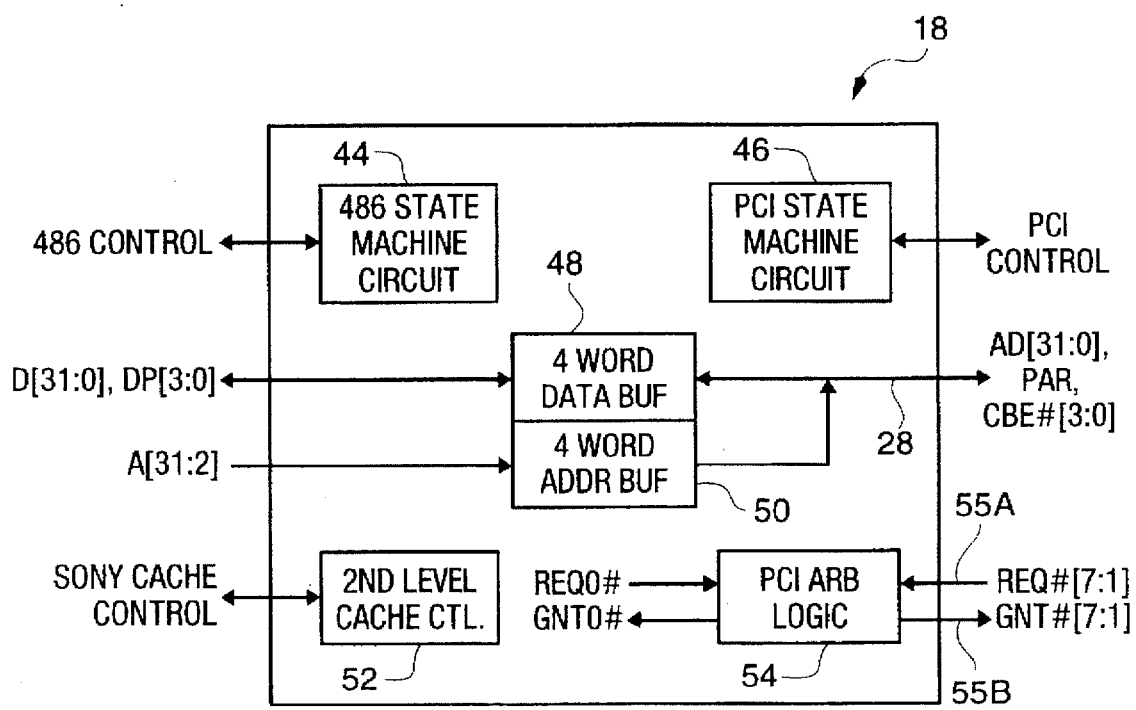
FIG. 6 is a block diagram of a third interface circuit of the disk array controller shown in FIGS. 3 and 4.

The third interface circuit 18 serves as a PCI bus master relative to the devices on the PCI Local Bus 28, and serves as both a PCI bus master and a PCI bus slave relative to the processor 12. As shown in FIG. 6, the third interface circuit includes circuit 44 which implements a first state machine such as an Intel 80486 state machine, circuit 46 which implements a second state machine such as a PCI Local Bus state machine, 4-word data buffer 48, 4-word address buffer 50, second level cache control circuitry 52 and arbitration logic 54.

The first and second state machines that are implement by circuits 44, 46 cooperate to convert or translate processor 12 bus cycles or control signals to equivalent PCI Local Bus 28 cycles or control signals in a known manner. In addition, the first and second state machines that are implemented by the circuits 44, 46 permit processor 12 burst mode code and data fetching across the PCI Local Bus 28 by converting or translating processor 12 burst mode fetch cycles to equivalent PCI Local Bus 28 cycles as would be known to one of ordinary skill in the art.

More specifically, the first state machine implemented by the circuit 44 translates Intel 80486SX/DX/DX2 burst mode fetch cycles of the processor 12 into appropriate PCI Local Bus 28 cycles. The appropriate PCI Local Bus cycles are defined in the above-identified document entitled PCI Local Bus Specification, Revision 2.1. The processor 12 burst mode fetch cycles are defined in the Intel 80486XX data book which is incorporated herein by reference. The third interface circuit 18 also includes circuitry for fetching the processor code and/or data from the DRAM 22 across the PCI Local Bus 28 in linear address order, and presenting the code/data to the processor 12 in the nonlinear address order required by the processor 12.

The 4-word data and address buffers 48, 50 are used for executing posted writes to a device connected to the PCI Local Bus 28. In operation, the write data from the processor 12 is latched into the data buffer 48 until the PCI Local Bus 28 is available for transferring the write data to the device designated in the address buffer 50. In addition, posted write data from the processor 12 will be transferred out of the address buffer 50 across the PCI Local Bus 28 in a burst if the processor 12 executes a number of posted write operations to consecutive memory addresses of the DRAM 22.

The second level cache control circuit 52 (FIG. 6) supports an optional look-aside secondary cache 56 (FIG. 3) through one or more control lines 58 (FIG. 3). A suitable look-aside second level cache is the CXK78486Q1-33 (cache-1C) integrated cache/controller chip, or the CX784862Q-33 (cache-2) integrated cache/controller chip, both of which are available from SONY Corporation. The SONY chips are designed to work with the Intel 80486 family of processors by connecting directly to the processor local bus 26 as shown in phantom (FIG. 3), and caching data in a look-aside manner with minimal connection to the third interface circuit 18. More specifically, the cache control circuits necessary to support secondary cache 56 are internal to the secondary cache 56 rather than being included in the third interface chip 18 as provided in the known Intel 82424ZX CDC chip. The third interface circuit 18 includes a support circuit which fetches code/data from the DRAM 22 or disk drive 33 in the event that the particular code/data requested by the processor 12 is not present in the first level cache internal to the processor 12 or the second level cache 56.

The PCI arbitration logic 54 handles all of the arbitration between the devices connected to the PCI Local Bus 28 through request lines 55a and grant lines 55b. If no devices are arbitrating for the PCI Local Bus 28, then by definition the third interface circuit 18 is granted access to the PCI Local Bus 28 for use in executing processor 12 bus cycles across the PCI Local Bus 28 such as fetching code from the DRAM 22 during a processor 12 burst code fetch operation. Many known arbitration schemes are suitable for implementation in the third interface circuit 18.

Figure 4:
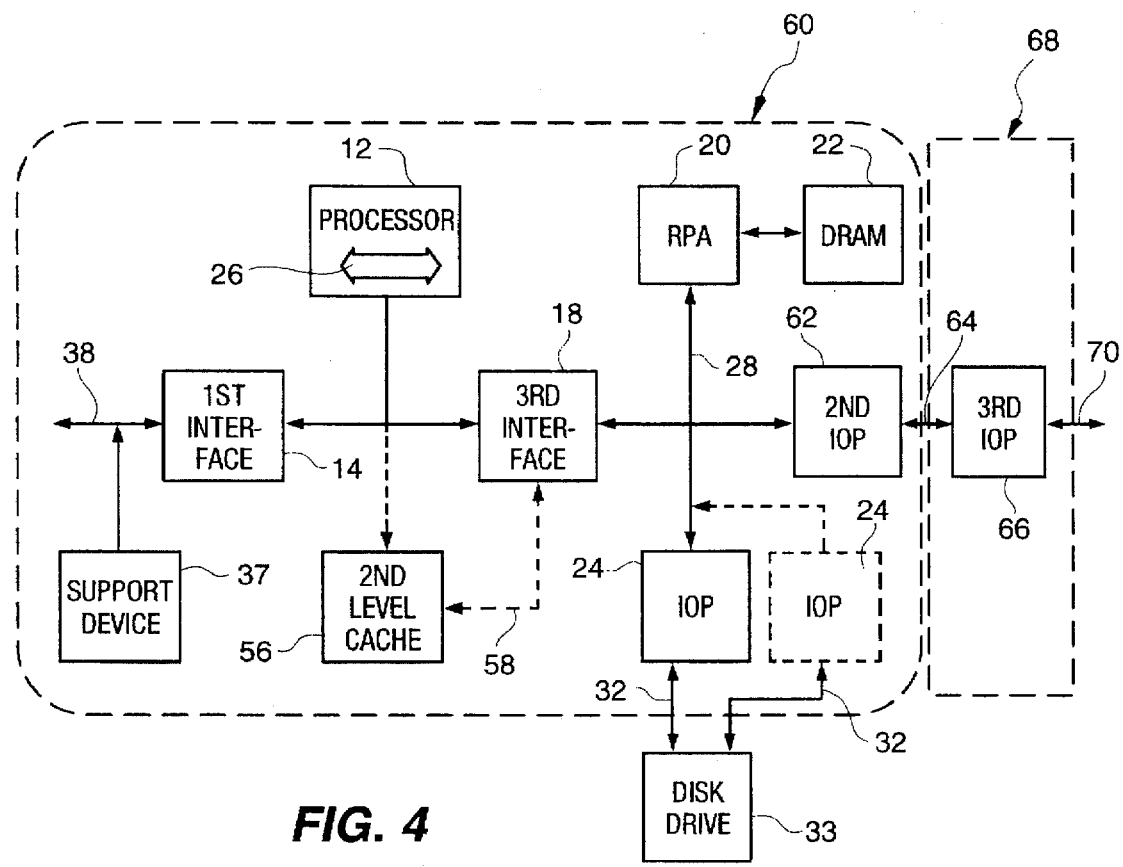
FIG. 4 is a block diagram of a second embodiment of a PCI-based disk array controller.

Referring now to FIG. 4, there is shown a SCSI Bus-to-SCSI Bus disk array controller 60. The same reference numerals are used to identify the same devices in FIGS. 3 and 4. The controller 60 includes a second input/output processor (IOP) 62 connected to the PCI Local Bus 28 in place of the second interface chip 16 (FIG. 3). The second input/output processor 62 is also connected through one or more cables 64, such as SCSI cables, to a third input/output processor (IOP) 66 associated with a SCSI host adapter 68 that is connected to a host SCSI Bus 70 through a slot (not shown) of a host device (not shown). It should be appreciated to one of ordinary skill in the art that data can be transferred between the second and third input/output processors 62, 63 such as 53C825A SCSI Input/Output Processor chips, at a rate of approximately 20 MByte/sec, or 40 MByte/sec for a 53C875 chip. In contrast, data can be transferred between the first and second PCI interfaces 40, 41 (FIG. 5) at a rate of 132 Mb/sec which is the specified data transfer rate of the PCI Local Bus 28.

In effect, the second input/output processor 62 functions in the same manner as the second PCI interface 41 (FIG. 5), and the third input/output processor 66 functions in the same manner as the first PCI interface 40 (FIG. 5). Thus, data is transferred from one scatter-gather list to a separate scatter-gather list across a common SCSI-interface in the disk array controller 60 shown in FIG. 4. In contrast, the second interface circuit 16 (FIG. 3) transfers data from one scatter-gather list to a separate scatter-gather list across the high-bandwidth DMA interface 42 (FIG. 5) in the controller 10.

In sum, the disk array controller architecture of the present invention improves the price/performance ratio of the controller 10 by permitting burst mode code/data fetching across the PCI Local Bus 28 through the third interface circuit 18, by providing code/data caching capability across the PCI Local Bus 28 through the third interface circuit 18, and by off-loading bandwidth to the auxiliary bus 38 across the internal local bus 26.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for transferring data in a controller connected between a host device and a disk drive, comprising the steps of:
    transferring from the host device to the controller a first scatter/gather list that indicates where a block of data is located in a host memory;
    generating a second scatter/gather list indicating where to store the block of data in a controller memory; and
    transferring the block of data from the host memory to the controller memory in accordance with the first scatter/gather list and the second scatter/gather list.

2. The method of claim 1, further including the step of:
    transferring the block of data from the controller memory to a disk drive.

3. The method of claim 1, wherein the step of transferring the block of data from the host memory to the controller memory includes the steps of:
    transferring the block of data from the host memory to an interface circuit at a first operating speed; and
    transferring the block of data from the interface circuit to the controller memory at a second operating speed that is different than the first operating speed.

4. The method of claim 1, further including the step of:
    generating parity information from the block of data.

5. The method of claim 4, further including the step of:
    storing the parity information in the controller memory.

6. The method of claim 4, further including the step of:
    transferring the parity information from the controller to the disk drive.

7. A method for transferring data in a controller connected to a host device and a disk drive, comprising the steps of:
    transferring a block of data from a disk drive to a controller memory;
    generating a first scatter/gather list indicating where the block of data is stored in the controller memory;
    generating a second scatter/gather list indicating where to store the block of data in a host memory; and
    transferring the block of data from the controller memory to the host memory in accordance with the first scatter/gather list and the second scatter/gather list.

8. The method of claim 7, wherein the step of transferring the block of data from the controller memory to the host memory includes the steps of:
    transferring the block of data from the controller memory to an interface circuit at a first operating speed; and
    transferring the block of data from the interface circuit to the host memory at a second operating speed that is different than the first operating speed.

9. The method of claim 7, further including the step of:
    transferring parity information from the disk drive to the controller.

10. The method of claim 9, further including the step of:
    generating missing data from the parity information and the block data.

11. The method of claim 10, further including the step of:
    transferring the generated missing data to the host device in accordance with the first scatter/gather list and the second scatter/gather list.

12. A controller connected to a host device and a disk drive, the controller comprising:
    a controller memory;
    an interface circuit coupled to said controller memory, said interface circuit being configured to receive from the host device a first scatter/gather list indicating where a block of data is located in a host memory of the host device and to generate a second scatter/gather list indicating where to store said block in said controller memory;
    an input/output processor coupled to said controller memory, said input/output processor configured to transfer said block of data from said controller memory to a disk drive.

13. The controller of claim 12, wherein:
    said interface circuit is further configured to receive said first scatter/gather list at a first operating speed and to transmit said block of data to said controller memory at a second operating speed that is different than said first operating speed.

14. The controller of claim 12, further comprising:
    a parity circuit coupled to said controller memory, said parity circuit configured to receive said block of data and to generate parity information from said block of data.

15. The controller of claim 12, wherein:
    said input/output processor is further configured to receive a second block of data from the disk drive and to transfer said second block of data to said controller memory.

16. The controller of claim 15, wherein:
    said input/output processor is further configured to receive parity information from the disk drive and to transfer said parity information to said controller memory.

17. The controller of claim 16, further comprising:
    a parity circuit coupled to said controller memory, said parity circuit configured to generate missing data from said second block of data and said parity information.

* * * * *